United States Patent
Aldridge

[11] Patent Number: 6,049,906
[45] Date of Patent: Apr. 18, 2000

[54] SILICONE FOAM PAD FOR A FIREFIGHTING GARMENT

[75] Inventor: Donald Aldridge, New Carlisle, Ohio

[73] Assignee: Lion Apparel, Inc., Dayton, Ohio

[21] Appl. No.: 09/250,753

[22] Filed: Feb. 16, 1999

[51] Int. Cl.[7] .................................................. A41D 13/00
[52] U.S. Cl. ......................... 2/23; 2/81; 2/93; 139/383 R
[58] Field of Search ............................ 139/383 R; 2/81, 2/93, 23

[56] References Cited

U.S. PATENT DOCUMENTS

| | | | |
|---|---|---|---|
| 2,589,636 | 3/1952 | Smith | 2/94 |
| 2,703,775 | 3/1955 | Panagrossi et al. | 154/128 |
| 2,956,032 | 10/1960 | Joyce | 260/2.5 |
| 3,076,206 | 2/1963 | Shaw et al. | 9/330 |
| 3,322,873 | 5/1967 | Hitchcock | 264/222 |
| 4,026,842 | 5/1977 | Lee et al. | 260/2.5 |
| 4,272,850 | 6/1981 | Rule | 2/24 |
| 4,808,634 | 2/1989 | Uriarte et al. | 521/87 |
| 4,994,317 | 2/1991 | Dugan et al. | 428/256 |
| 5,014,357 | 5/1991 | Wiseman, Sr. | 2/81 |
| 5,050,244 | 9/1991 | Kleinman | 2/227 |
| 5,551,084 | 9/1996 | Freese, III | 2/23 |
| 5,694,981 | 12/1997 | Stanhope et al. | 139/383 R |
| 5,720,045 | 2/1998 | Aldridge | 2/81 |
| 5,724,673 | 3/1998 | Aldridge | 2/81 |
| 5,729,832 | 3/1998 | Grilliot et al. | 2/23 |

OTHER PUBLICATIONS

Laboratoire de Recherches et de Controle du Caoutehoue et des Plastiques, "Technical Data ISOPACE 2000 MS Silicone foam," Jun. 24, 1996.

Dickson PTL, "Silocone Foam Technolgy Serving Performance,".

Southern Mills, Inc., "Arashield Revolutionary New Reinforcement Fabric for Outer Shells," 1992.

Primary Examiner—John J. Calvert
Assistant Examiner—Robert H. Muromoto, Jr.
Attorney, Agent, or Firm—Thompson Hine & Flory LLP

[57] ABSTRACT

A hazardous duty garment includes an outer shell layer of heat-, flame-, and abrasion-resistant aramid material and a pad attached to the outer shell layer, where the pad includes a fabric substrate of heat-, flame-, and abrasion-resistant material bonded to a layer of silicone foam material. Preferably, the fabric substrate is a woven aramid and carbon fiber, face cloth material and is treated with a durable, water-repellant finish. Preferably, the pad is stitched to the outer surface of the outer shell layer and oriented such that the layer of silicone foam material faces the outer shell layer. The pad is used in the knee portion of a pant leg of a firefighter garment, as well as on an elbow or forearm portion of a sleeve of a firefighter garment and on a shoulder portion of a firefighter duty garment.

14 Claims, 2 Drawing Sheets

SILICONE FOAM PAD FOR A FIREFIGHTING GARMENT

BACKGROUND

The present invention relates to hazardous duty garments and, more particularly, to a firefighter garment having heat- and flame-resistant pads in areas of high wear and compression.

Protective garments are designed to shield a wearer from a variety of environmental hazards, and firefighter garments are representative of such garments. A conventional firefighting ensemble comprises a turnout coat and pant, each of which includes an outer shell, a moisture barrier located within the outer shell, a thermal liner located within the moisture barrier and an innermost face cloth layer. The outer shell typically is constructed of an abrasion-, flame- and heat-resistant material such as a woven aramid material, typically NOMEX®, KEVLAR®, or Z-200® (all are trademarks of E. I. DuPont de Nemours & Co., Inc.) or a polybenzamidazole such a PBI® (a trademark of Celanese Corp.) fiber material. The moisture barrier typically includes a semipermeable membrane layer which is moisture vapor permeable but impermeable to liquid moisture, such as CROSSTECH® (a trademark of W. L. Gore & Associates, Inc.). The membrane layer is bonded to a substrate of flame- and heat-resistant material, such as an aramid or PBI® material.

It is often desirable to provide padding to the knee portions of firefighting pants, or to the elbow/forearm or shoulder areas of firefighting turnout coats to provide extra cushioning against compression or protection from heat for the firefighter's knees, elbows, forearms and/or shoulders. Such cushioning is particularly useful when a firefighter is kneeling or crawling, or is carrying equipment such as a ladder, a hoseline or SCBA equipment, and is also useful to absorb blows and other shocks that may be encountered in hazardous duty situations. In such situations the weight of a firefighter, or the weight of the equipment, is concentrated in a small area, which compresses the thermal liner in that area and thereby significantly reduces its insulating ability.

A problem with the conventional pads for use with firefighting garments is that a relatively low-cost pad that is relatively simple to attach to a firefighting garment and that meets the NFPA (National Fire Protection Associate) 1971 standard, incorporated herein by reference, (which require substantial heat- and flame-resistance as well as specified tear strength) is not available. There is also a problem with many conventional knee- and/or elbow-pads in that they provide relatively little additional thermal protection to the knees and/or elbow portions of the garment when compressed. Accordingly, such conventional elbow-, shoulder- and/or knee-pads do little to prevent burns in the knees, shoulders and/or elbows of firefighters resulting from the loss of insulating ability caused by compression of the garment in those areas. For those conventional elbow-, shoulder- or knee-pads that do provide additional thermal protection, there exists a problem of such thermal protection breaking down over time due to damage, compression and/or abrasions to the pads. A further problem with conventional elbow-, shoulder- and/or knee-pads is their tendency to absorb water or otherwise retain substantial quantities of water. Saturated pads, when exposed to thermal energy conduct that heat at far greater rates than insulation which does not store water.

SUMMARY

The present invention is a pad intended to cover the knee, elbow or shoulder areas of a firefighter garment, that is relatively simple and inexpensive to attach to the garment; is able to meet relevant NFPA 1971 standards for such articles; provides substantial additional thermal protection to the portion of the garment to which it is attached; is extremely durable against abrasions; and is relatively lightweight. The present invention is also directed to a firefighting garment having such a pad attached thereto.

In a first embodiment, the present invention is a hazardous duty garment with an outer shell layer of heat-, flame-, and abrasion-resistant aramid material and including a pad attached to the outer shell layer, the pad including a fabric substrate of heat-, flame-, and abrasion-resistant material bonded to a layer of silicone foam material. Preferably, the fabric substrate is a woven aramid and carbon fiber, face cloth material and is treated with a durable, water-repellant finish. The composite pad is preferably stitched to the outer surface of the outer shell layer and oriented such that the layer of silicone foam material faces the outer shell layer.

The layer of silicone foam material preferably is sufficiently thick to provide cushioning and substantial additional thermal protection to the area of the garment to which the pad is attached; and preferably is approximately 3 mm to approximately 10 mm thick. Preferably, the layer of silicone foam material is mechanically bonded to the fabric substrate material. One such way to mechanically bond the silicone foam to the fabric substrate is to cure the foam directly onto the fabric substrate.

In another aspect of the present invention a firefighter pant comprises an outer shell layer and a knee pad attached to the outer surface of the outer shell layer, where the knee pad includes a flame-, abrasion-, and tear-resistant fabric substrate bonded to a layer of silicone foam, and where the kneepad is oriented such that the silicone foam faces the outer shell layer. Additionally, the fabric substrate is preferably treated with a durable water repellant finish.

Accordingly, it is an object of the present invention to provide a compression-resistant pad for use with a firefighter garment that is relatively simple and inexpensive to attach to a firefighter garment; meets relevant NFPA 1971 standards; provides substantial additional thermal protection to the portion of the garment to which it is attached; is extremely durable; has substantially less water absorption; and is relatively lightweight. Other objects and advantages of the present invention will be apparent from the following description, the appended claims and the accompanying drawings.

DETAILED DESCRIPTION

Figure 1:
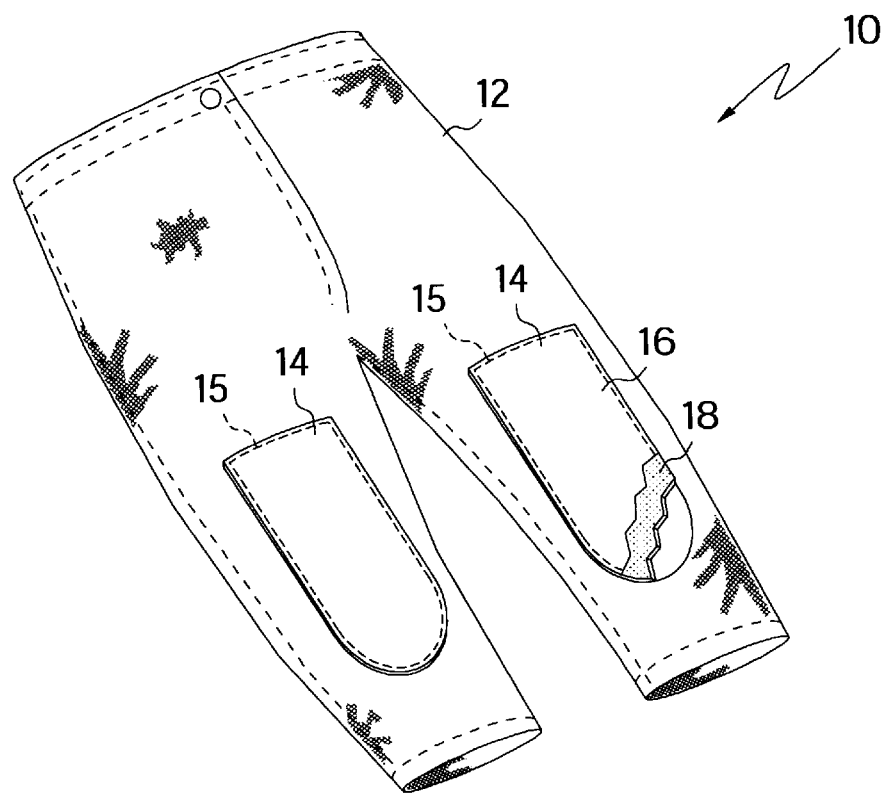
FIG. 1 is a somewhat schematic, perspective view of a firefighter pant incorporating silicone foam composite pads of the present invention, where one of the of the pads is shown as partially broken away to reveal the layers of the pad component.

As shown in FIG. 1, the protective garment of the present invention is shown in the form of a firefighter pant, generally designated 10. The firefighter pant 10 includes an abrasion-, heat-, and flame-resistant outer shell, generally designated 12, which covers substantially the entire outer surface of the article. The outer shell is preferably a woven aramid material such as NOMEX®, KEVLAR® or Z-200®, a blend of such aramid materials, a PBI® material, or a blend of aramid and PBI® materials. Although not shown, the firefighter pant 10 also preferably includes thermal barrier and moisture barrier layers within the outer shell, or any conventional alternatives to such layers, as familiar to those skilled in the art. See, for example, U.S. Pat. Nos. 5,539,928 and 5,697,101, the disclosures of which are incorporated herein by reference.

The firefighter pant 10 also includes a pair of knee pads 14 stitched to the outer surface of the outer shell layer 12 by stitching 15, which generally follows the periphery of the knee pad. It will, of course, be apparent to those skilled in the art that the knee pads may also be attached to the outer shell by other commonly practiced means, such as adhesives, strips of hook-and-loop fastening material, inserting them into pockets, slide fasteners, and the like. The knee pads 14 protect and provide padding for the knees and shins of the firefighter when worn.

Figure 2:
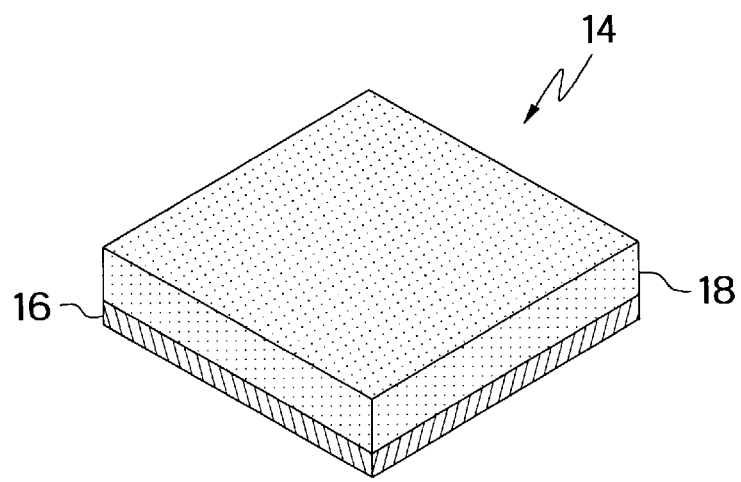
FIG. 2 is a perspective detail showing the composite pad component of FIG. 1.

As shown in FIGS. 1 and 2, each knee pad 14 includes a fabric substrate of heat-, flame-, abrasion- and tear-resistant material 16 bonded to a layer of closed-cell silicone foam material 18. The layer of silicone foam material 18 preferably is sufficiently thick to provide cushioning and substantial additional thermal protection to the area of the garment to which the pad is attached; and preferably is approximately 3 mm to approximately 10 mm thick. The knee pads 14 are attached to the outer surface of the outer shell layer 12 such that the silicone foam layer 18 faces the outer shell layer 12 and is essentially sandwiched between the fabric substrate 16 and the outer shell 12. The fabric substrate 16 may be treated with a durable, water repellant finish to minimize liquid moisture absorption into the knee pad 14. Such a durable, water repellant finish is provided by treating the substrate 16 (or the entire pad) with a commercially available perfluorohydrocarbon finish such as TEFLON® (a trademark of E. I. DuPont de Nemours & Co., Inc.) and/or SCOTCHGUARD® (a trademark of Minnesota Mining & Manufacturing Co.).

The fabric substrate 16 is preferably a woven aramid and carbon fiber material, which is mechanically bonded to the layer of silicone foam material 18 to create a silicone foam and fabric substrate composite construction. The mechanical bond may be provided by curing the silicone foam material to the fabric substrate. Such a fabric substrate and silicone foam composite material is commercially available as "ISOSPACE 2000 MS" from Dixon PTL, Rue des Chartiniéres, Dogneux, France.

It has been found that the silicone pads 14 of the present invention provide high resistance to abrasion and flame (i.e. they do not char, melt or support combustion), they resist thermal conductivity extremely well and they also provide sufficient cushioning to the wearer in the areas of the garment to which they are attached. The composite construction of the silicone pads 14 imparts exceptional tear and abrasion resistance for the pads (in comparison to conventional pads, the silicone pads 14 of the present invention provide two- or three-times the abrasion and flame resistance).

Figure 3:
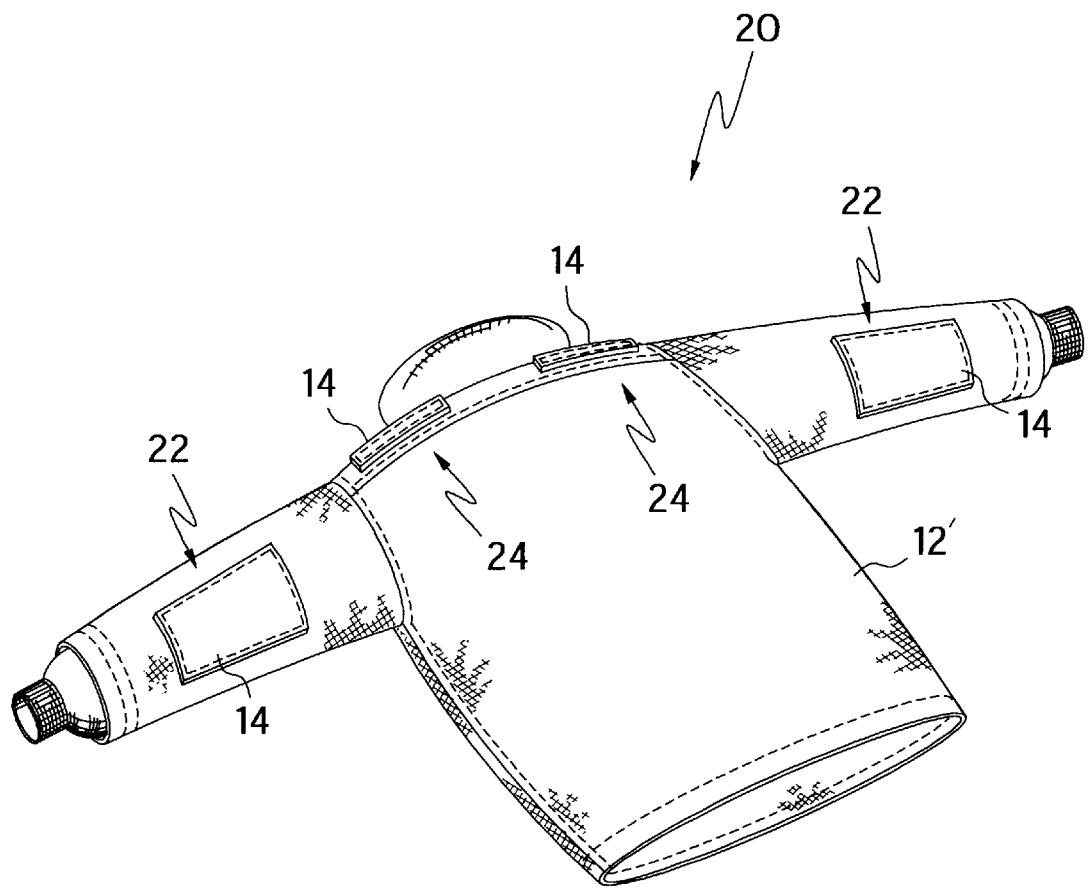
FIG. 3 is an alternative embodiment showing a firefighters jacket.

As shown in FIG. 3, an alternate embodiment of the present invention is shown in the form of a firefighter turnout jacket, generally designated 20. The firefighter jacket 20 includes an abrasion-, heat-, and flame-resistant outer shell, generally designated 12', which covers substantially the entire outer surface of the article. The outer shell is preferably a compact weave of an aramid material such as NOMEX® or KEVLAR®, a blend of such aramid materials, a PBI® material, or a blend of aramid and PBI® materials. Although not shown, the firefighter jacket 20 also preferably includes thermal barrier and moisture barrier layers within the outer shell, or any conventional alternatives to such layers, as familiar to those skilled in the art. See, for example, U.S. Pat. Nos. 5,539,928 and 5,697,101. The jacket 20 includes the silicone pad components 14 of the present invention attached to the elbow portions 22 of a sleeve and to the shoulder portions 24.

It is also within the scope of the invention to attach the silicone pad components 14 to other areas of a hazardous duty garment requiring additional thermal, abrasion and/or impact protection.

While the forms of apparatus herein described constitute preferred embodiments of this invention, it is to be understood that the invention is not limited to these precise forms of apparatus, and that changes may be made therein without departing from the scope of the invention.

What is claimed is:

1. A hazardous duty garment comprising:

an outer shell layer of heat, flame and abrasion resistant aramid material; and a pad attached to the outer shell layer, the pad including a fabric substrate of heat, flame and abrasion resistant material and a layer of silicone foam material bonded to the fabric substrate.

2. The hazardous duty garment of claim 1 wherein the fabric substrate is a woven aramid and carbon fiber face cloth material.

3. The hazardous duty garment of claim 2 wherein the fabric substrate is treated with a durable, water-repellant finish.

4. The hazardous duty garment of claim 2 wherein the fabric substrate is cured to the layer of silicone foam material.

5. The hazardous duty garment of claim 4 wherein the layer of silicone foam material is approximately 3 mm to approximately 10 mm thick.

6. The hazardous duty garment of claim 1 wherein the pad is stitched to the outer surface of the outer shell layer.

7. The hazardous duty garment of claim 6 wherein the pad is oriented such that the layer of silicone foam material faces the outer shell layer.

8. The hazardous duty garment of claim 1 wherein the hazardous duty garment includes a pant leg and the pad is attached to a knee portion thereof.

9. The hazardous duty garment of claim 1 wherein the hazardous duty garment includes a sleeve and the pad is attached to an elbow portion thereof.

10. The hazardous duty garment of claim 1 wherein the pad is attached to a shoulder portion thereof.

11. The hazardous duty garment of claim 1 wherein the hazardous duty garment is a firefighter garment.

12. A firefighter pant comprising:

an outer shell layer; and a knee pad attached to the outer surface of the outer shell layer;

the knee pad including a flame, abrasion and tear resistant fabric substrate bonded to a layer of silicone foam, the knee pad being oriented such that the silicone foam faces the outer shell layer.

13. The firefighter pant of claim 12 wherein the fabric substrate is treated with a durable water-repellant finish.

14. A firefighter garment comprising:

an outer shell layer of heat, flame and abrasion resistant aramid material; and a silicone foam composite pad attached to the outer shell layer, the silicone foam composite pad including a fabric substrate of woven aramid and carbon fiber face cloth material bonded to a layer of silicone foam material;

the silicone foam composite pad providing an outer-most layer of the firefighter garment and being oriented so that the silicone foam material faces the outer shell layer of the firefighter garment and the fabric substrate protects the foam material from flame and abrasion.

* * * * *